United States Patent
Arnold et al.

(10) Patent No.: US 9,596,240 B2
(45) Date of Patent: *Mar. 14, 2017

(54) METHOD AND SYSTEM FOR LAYER-3 SUBSCRIBER LOGIN IN A CABLE DATA NETWORK

(75) Inventors: Erich Arnold, Naperville, IL (US); Thomas J Cloonan, Lisle, IL (US); Jeff Howe, West Chicago, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/649,318

(22) Filed: Dec. 29, 2009

(65) Prior Publication Data

US 2011/0161510 A1    Jun. 30, 2011

Related U.S. Application Data

(63) Continuation of application No. 10/930,109, filed on Aug. 30, 2004, now Pat. No. 7,653,932.

(51) Int. Cl.
| | |
|---|---|
| *G06F 15/16* | (2006.01) |
| *H04L 29/06* | (2006.01) |
| *H04L 12/28* | (2006.01) |
| *H04W 12/08* | (2009.01) |

(52) U.S. Cl.
CPC .......... *H04L 63/10* (2013.01); *H04L 12/2801* (2013.01); *H04L 12/287* (2013.01); *H04L 63/164* (2013.01); *H04W 12/08* (2013.01)

(58) Field of Classification Search
CPC .................................................... H04L 12/2801
USPC ......................................................... 709/229
See application file for complete search history.

(56) References Cited

U.S. PATENT DOCUMENTS

| | | | |
|---|---|---|---|
| 5,913,164 A | 6/1999 | Pawa et al. | |
| 6,351,773 B1 | 2/2002 | Fijolek et al. | |
| 6,466,986 B1* | 10/2002 | Sawyer | H04L 12/2801 |
| | | | 709/245 |

(Continued)

OTHER PUBLICATIONS

Cisco. "Subscriber Management Packet Filtering for DOCSIS 2.0" http://www.cisco.com/en/US/docs/ios/cable/configuration/guide/SMPF_feature.html Nov. 16, 2009. pp. 1-14.*

(Continued)

*Primary Examiner* — Imad Hussain
(74) *Attorney, Agent, or Firm* — Stewart M. Wiener

(57) ABSTRACT

A subscriber login server is used for managing a subscriber login session. The login server is associated with a DHCP server for configuring a premise equipment device and operator-managed device. A subscriber login client at the premise equipment device securely communicates login username and password identifiers to the subscriber login server without using PPP technology. The login server retrieves matching identifiers from a RADIUS server and authorizes service with messages to the DHCP server and the CMTS.

The login client can emulate a PPP login client so that a user's interface is similar to a PPPoE client. However, a layer-3 CMTS can be used instead of a layer-2 CMTS. In addition, subscriber authentication and accounting using RADIUS are preserved, positive network access control at the CMTS is maintained, and native IP traffic is routed or switched for maximum performance and QoS treatment.

8 Claims, 5 Drawing Sheets

(56) References Cited

U.S. PATENT DOCUMENTS

| | | | |
|---|---|---|---|
| 6,487,605 B1 | 11/2002 | Leung | |
| 6,633,835 B1* | 10/2003 | Moran | H04L 47/10 |
| | | | 702/181 |
| 6,697,862 B1 | 2/2004 | Beser et al. | |
| 6,697,864 B1 | 2/2004 | Demirtjis et al. | |
| 6,754,622 B1 | 6/2004 | Beser et al. | |
| 6,775,276 B1 | 8/2004 | Beser | |
| 6,891,841 B2 | 5/2005 | Leatherbury et al. | |
| 6,895,511 B1* | 5/2005 | Borsato | H04L 29/06 |
| | | | 726/5 |
| 6,986,157 B1* | 1/2006 | Fijolek | H04L 12/18 |
| | | | 370/395.2 |
| 7,073,055 B1* | 7/2006 | Freed | H04L 63/123 |
| | | | 713/155 |
| 7,142,651 B2 | 11/2006 | Ronen et al. | |
| 7,185,079 B1 | 2/2007 | Bainbridge et al. | |
| 7,231,516 B1 | 6/2007 | Sparrell et al. | |
| 7,353,280 B2 | 4/2008 | Chiles et al. | |
| 7,359,973 B2 | 4/2008 | Chiles et al. | |
| 7,483,632 B2* | 1/2009 | Sung | H04L 47/10 |
| | | | 398/63 |
| 7,987,228 B2* | 7/2011 | McKeown | H04L 12/24 |
| | | | 379/1.01 |
| 2001/0034759 A1 | 10/2001 | Chiles et al. | |
| 2002/0007412 A1 | 1/2002 | Paridaens et al. | |
| 2002/0013844 A1* | 1/2002 | Garrett | H04L 12/2801 |
| | | | 709/225 |
| 2002/0136203 A1 | 9/2002 | Liva et al. | |
| 2003/0101357 A1 | 5/2003 | Ronen et al. | |
| 2003/0167319 A1* | 9/2003 | Venkatesulu | H04L 12/2801 |
| | | | 709/223 |
| 2003/0172170 A1 | 9/2003 | Johnson | |
| 2004/0018829 A1* | 1/2004 | Raman | G06Q 20/28 |
| | | | 455/406 |
| 2004/0199472 A1* | 10/2004 | Dobbins | G06Q 20/123 |
| | | | 705/50 |
| 2004/0199604 A1* | 10/2004 | Dobbins | H04L 12/2856 |
| | | | 709/217 |
| 2004/0261116 A1 | 12/2004 | Mckeown et al. | |
| 2005/0005154 A1* | 1/2005 | Danforth | H04L 63/10 |
| | | | 726/26 |
| 2005/0050161 A1* | 3/2005 | Arnold | H04L 61/2015 |
| | | | 709/217 |
| 2007/0180120 A1 | 8/2007 | Bainbridge et al. | |
| 2008/0101793 A1* | 5/2008 | Koch | H04L 29/12009 |
| | | | 398/1 |

OTHER PUBLICATIONS

Rigney, C. et al. "RFC 2138: Remote Authentication Dial in User Service (RADIUS)" http://www.ietf.org/rfc/rfc2138.txt Apr. 1997. pp. 1-64.*

PCT International Search Report, PCT Application No. PCT/US04/28222, Mail Date: Mar. 9, 2006.

* cited by examiner

PPPoE LOGIN CLIENT
PRIOR-ART

METHOD AND SYSTEM FOR LAYER-3 SUBSCRIBER LOGIN IN A CABLE DATA NETWORK

CROSS REFERENCE TO RELATED APPLICATION

This application is a continuation of prior application Ser. No. 10/30,109, filed on Aug. 30, 2004, and issued on Jan. 26, 2010 as U.S. Pat. No. 7,653,932 B2.

FIELD OF THE INVENTION

The present invention relates generally to broadband communication, and more particularly to a method and system for logging in to a network using a layer 3 CMTS.

BACKGROUND

Community antenna television ("CATV") networks have been used for more then four decades to deliver television programming to a large number of subscribers. Increasingly, CATV networks are used by providers to provide data services to subscribers. For example, operator managed devices, such as cable modems, used in a broadband cable modem termination system ("CMTS") are capable of transmitting and receiving Internet data using the Data Over Cable Service Interface Specification ("DOCSIS") protocol. DOCSIS provides a standard that allows network devices made by different vendors to communication with one another.

In addition to cable modem networks, where the modems are typically located at a customer's premises and a Cable Modem Termination System ("CMTS") is located at an provider's/operator's head end location, Digital subscriber Line ("DSL") technology is used by telephone companies to augment their 'dial-up' services to better compete with the cable companies broadband offerings. The telephone companies typically require that a user 'log-in' to the provider's network, either DSL or Dial-up, using Point-to-Point Protocol over Ethernet ("PPPoE") technology.

In the United States, this typically gives the data over cable providers a competitive differentiator, in that a cable modem broadband connection is typically 'always on' when the modem has been turned on and booted up. Thus, customers do not have to manually log on to the provider's network.

However, outside of North America, many cable operators are part of a larger enterprise that provides Internet access via cable, DSL, and dial-up. Thus, operators typically manage the cable data service in the same way as the DSL and dial-up services. As such, access to the cable service is controlled via a PPPoE login client that is installed on each Customer Premise Equipment ("CPE"), such as a personal computer, for example. This is similar to the operator's DSL service configuration and thus is familiar to them.

In such an architectural arrangement 2, as shown in FIG. 1, the login client 4 communicates with a subscriber management server ("SMS") 6 at the cable head end that authenticates the subscriber and logs session accounting records in a Remote Authentication Dial Up Server 10 ("RADIUS"), configures the IP settings of the client 4, and terminates the PPPoE tunnel to allow the encapsulated IP packets to be routed to their destination.

Turning now to FIG. 2, the configuration and subscriber login processes in a prior art system are illustrated to provide a comparison to the configuration and subscriber login pathways associated with system 18 as shown in FIG. 3, reference to which is discussed in detail below in the Detailed Description. In FIG. 2, when cable modem 16 boots up, it interacts with dynamic host configuration protocol ("DHCP") server 14. After network access has been provided to modem 16 and logged by DHCP server 14, PPPoE client 4 establishes a session by sending login information, typically comprising a log in identifier and a password, to SMS 6. SMS 6 interacts with RADIUS server 10 to record session statistics therein. These statistics are later used for billing and other purposes as discussed above. While this multi-path, distributed login scheme is functional, it is inefficient because different servers are used for configuring and logging in the CM 16 and CPE client 4. In addition, the PPPoE client 4 encapsulates login data into Ethernet packets for communication with SMS 6. Thus, CMTS 12 is a layer-2 switch because after modem 16 is registered at step A, the CPE client 4 is authenticated through SMS 6 at step B, after which the SMS records the session in the RADIUS server 10 at step C. As discussed above, this allows the SMS to authenticate the client 4, so that a provider's operation can use a similar method for authenticating DSL, dial-up and cable subscribers. Thus, the same RADIUS server 10 can be used for all of a provider's customers.

The advantage to this architecture is that the PPP and RADIUS components are in common with the DSL and dial-up architecture. Thus, efficiency of the operator's subscriber accounting and billing are more efficient. Also, some countries have laws that require operators to provide subscriber-access-records to law enforcement authorities; RADIUS accounting records may be used for this as well.

The primary disadvantage to this architecture is that PPPoE encapsulates the IP packets between the client and the SMS in an Ethernet frame that must be forwarded via a Layer-2 switching CMTS 12. This effectively limits the operator to using older generation Layer-2 switching CMTSs 12 instead of using next-generation Layer-3 routing IP CMTSs that are the current state of the art in terms of wire-speed Quality of Service ("QoS"), high capacity and high availability. Furthermore, there is a significant performance penalty for the encapsulation of IP in PPPoE as SMS 6 must be capable of high performance encapsulation and routing of the IP traffic in the PPPoE tunnels for each client. An additional issue is that PPPoE encapsulated IP headers cannot be inspected by the DOCSIS 1.1 service flow classifiers and hence any benefits of per application QoS (especially VoIP) are not available to PPPoE clients.

As an alternative, if a Layer 2 Tunneling Protocol ("L2TP") client is used for each subscriber (instead of a PPPoE client) to permit the use of PPP over a routing CMTS in the path, then the SMS performance is even further degraded. Another variation on this theme is for the routing CMTS 12 to perform a PPPoE-to-L2TP gateway function to allow the aggregation of the client PPP sessions into a single L2TP session to the SMS to reduce the performance impact on the SMS. However, this also imposes a significant performance penalty on the CMTS as the cost of the PPPoE encapsulation just moves from one device in the network to another.

Another disadvantage is that the DOCSIS architecture uses the DHCP protocol to configure the cable modems and it is available to be used to configure the CPE as well. A DHCP server 14 that is typically integrated into a more functional subscriber management package provided by third party vendors can handle the management of both of these devices. But when PPPoE is used in a DOCSIS cable data system, cable modems 16 are configured via DHCP in one device and the CPEs 4 are configured via PPPoE in yet another device. This creates unnecessary management costs and complexity for the cable operator.

Thus, there is a need in the art for a method and system that eliminates the need for PPPoE login in a cable modem data system. There is also a need in the art for a method and system that use layer-3 routing, rather than layer-2 switching.

SUMMARY

An aspect unifies CPE and CM configuration via dynamic host configuration protocol ("DHCP"). Thus, subscriber authentication and accounting using RADIUS are preserved, positive network access control at the CMTS is maintained, and native IP traffic is routed or switched for maximum performance and QoS treatment. By taking the SMS device out of the IP traffic path, the need for PPPoE encapsulation and Layer-2 CMTSs is eliminated, a major bottleneck is removed and equipment costs are reduced. This aspect facilitates the same subscriber login and accounting semantics that are provided by the less efficient PPPoE architecture, but with better performance and fewer equipment costs. In addition, this solution will work for both routing and switching CMTSs and will make the transition to next generation routing CMTSs easier by not requiring a change to the CPE client configuration.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 3:
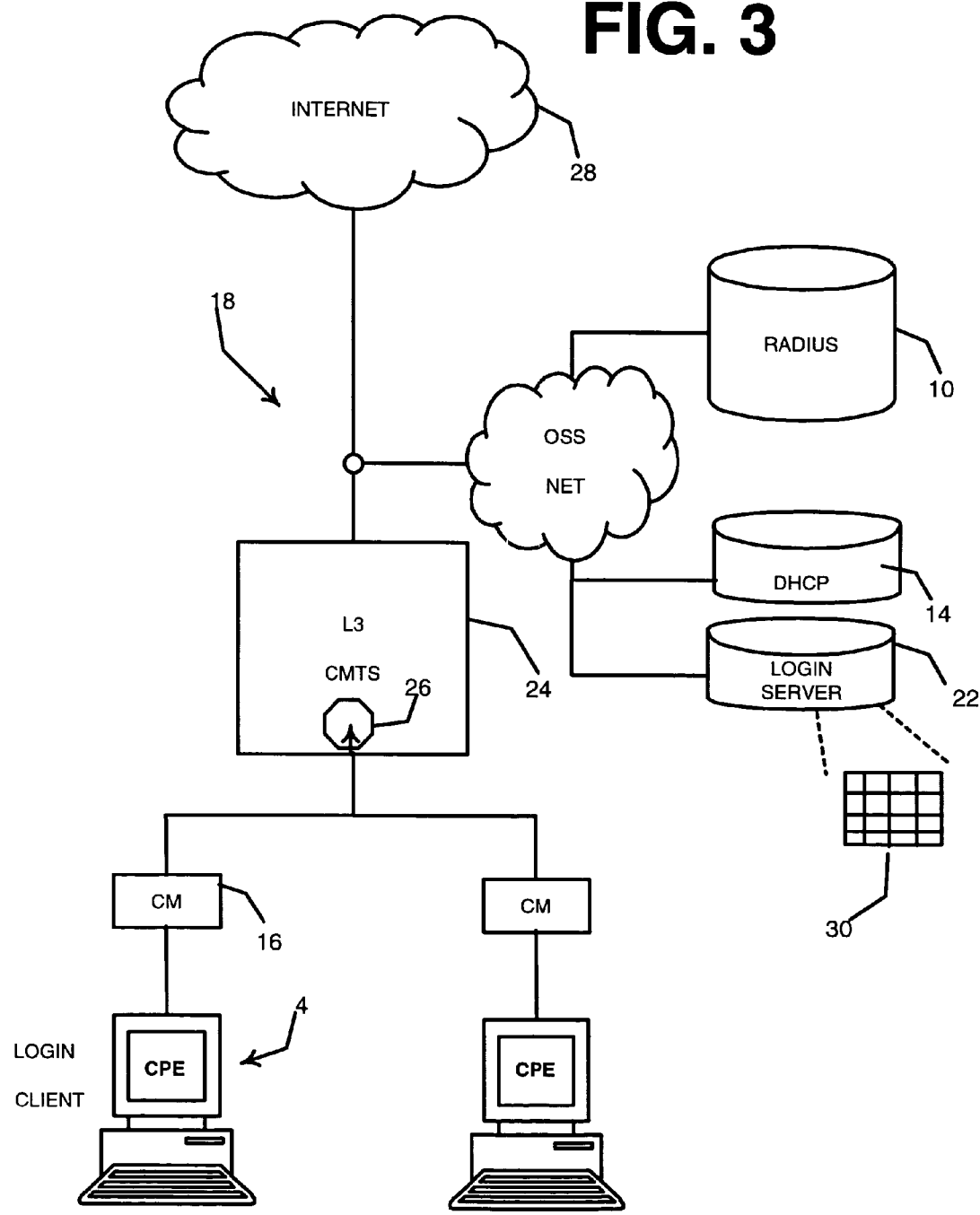
FIG. 3 illustrates a system for using a DHCP server for providing secure client log-in via a layer-3 CMTS.

Turning now to the figures, FIG. 3 illustrates a system 18 for facilitating a subscriber login client running on a subscriber's PC 4 securely communicating with a subscriber login server 22. It will be appreciated that the login client 4 generally refers to an executable software program being run on a subscriber's (or customer's) premise equipment, typically a PC. Thus, for clarity, references herein to login client, PC, or CPE may be used interchangeably in conjunction with reference numeral 4.

To the subscriber, the interface of login client 4 appears like a PPPoE client. However, instead of contacting SMS 6 as shown in FIG. 1, client 4 securely contacts login server 22 using Secure Socket Layer ("SSL") technology, e.g. HTTPS, and sends an encrypted userid and password to the login server.

Figure 1:
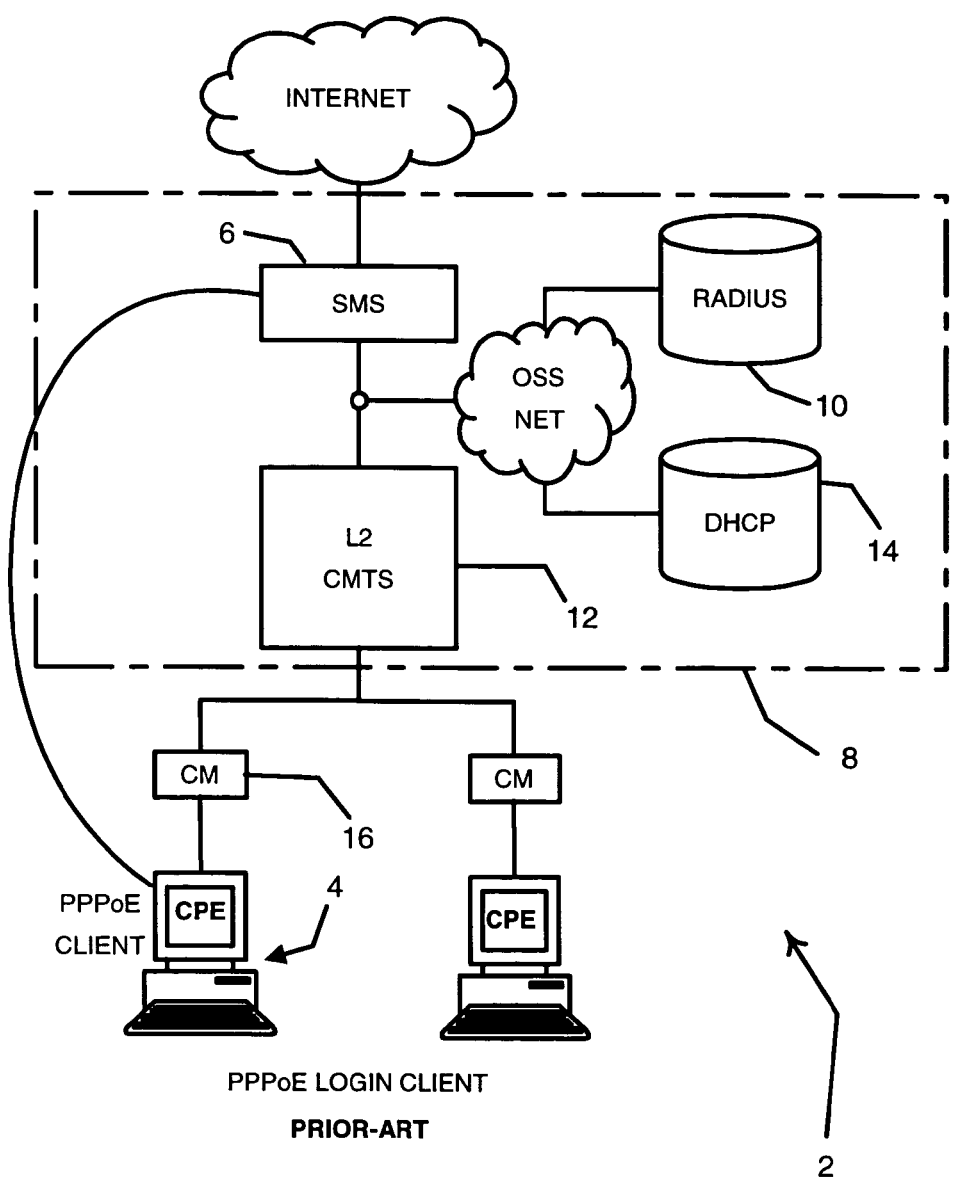
FIG. 1 illustrates a system for facilitating subscriber log-in using a PPPoE client over a cable modem data network.

System 18 includes DHCP server 14, as shown in FIG. 1. DHCP server 14 is complemented by login server 22 that manages the subscriber login session. Login server 22 communicates with RADIUS server 10 for subscriber authentication and accounting and with a DOCSIS CMTS 24 via simple network management protocol ("SNMP") to control network access for CPE 4 and to obtain session traffic statistics. Login client 4 periodically "checks-in" with the login server 22 with a "hello" message to demonstrate client activity. Login server 22 preferably will automatically terminate a subscriber login session if client 4 does not check-in with the login server on a regular basis. RADIUS server 10 preferably provides subscriber authentication and accounting.

Layer 3 DOCSIS CMTS 24 use the standard DOCSIS Subscriber Management filters 26 to positively control network access by CPE 4 as directed by login server 22 via SNMP. Also, session traffic statistics are available to login server 22 via DOCSIS SNMP MIBs.

Figure 2:
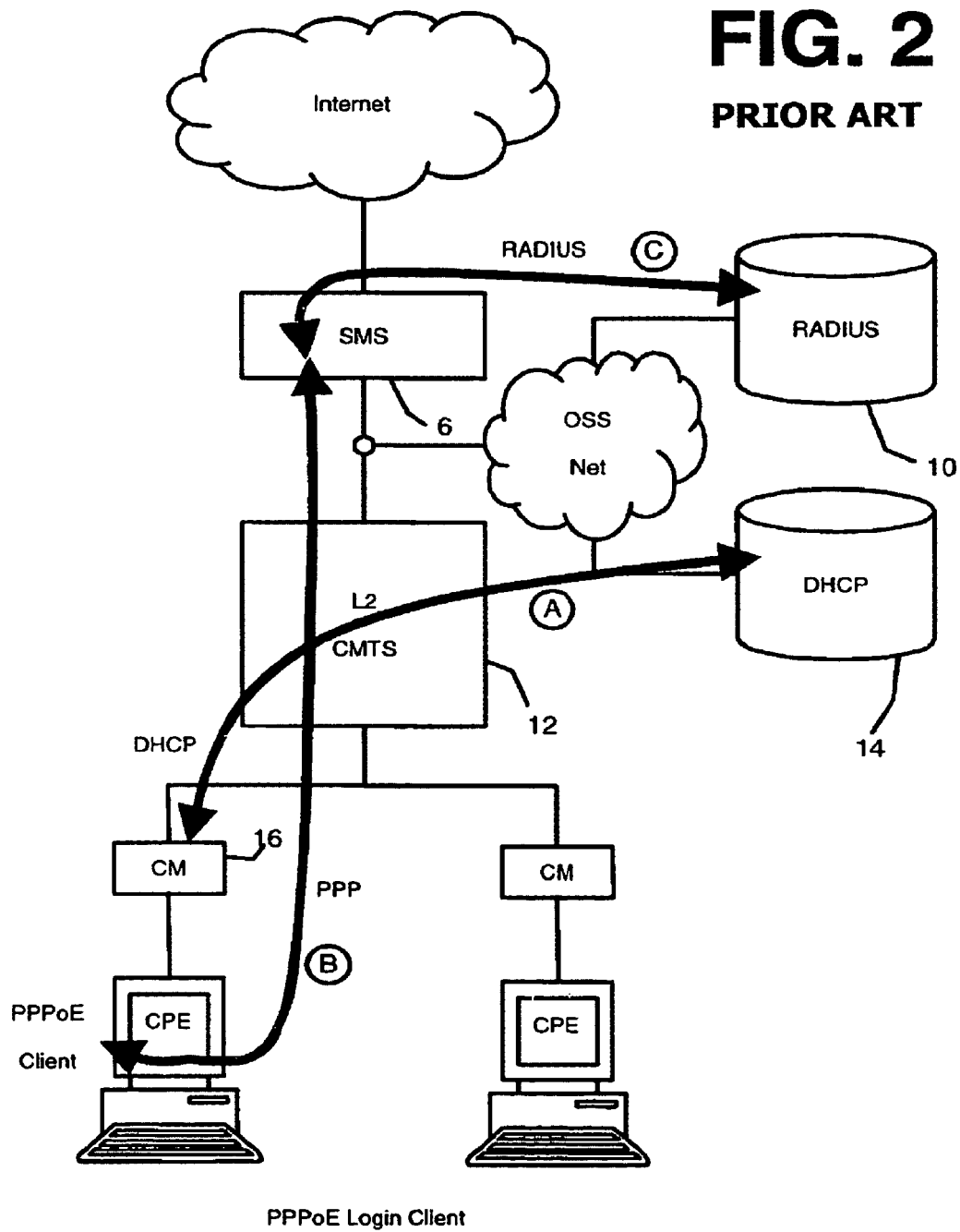
FIG. 2 illustrates the major steps in a system for facilitating subscriber log-in using a PPPoE client over a cable modem data network.
Figure 4:
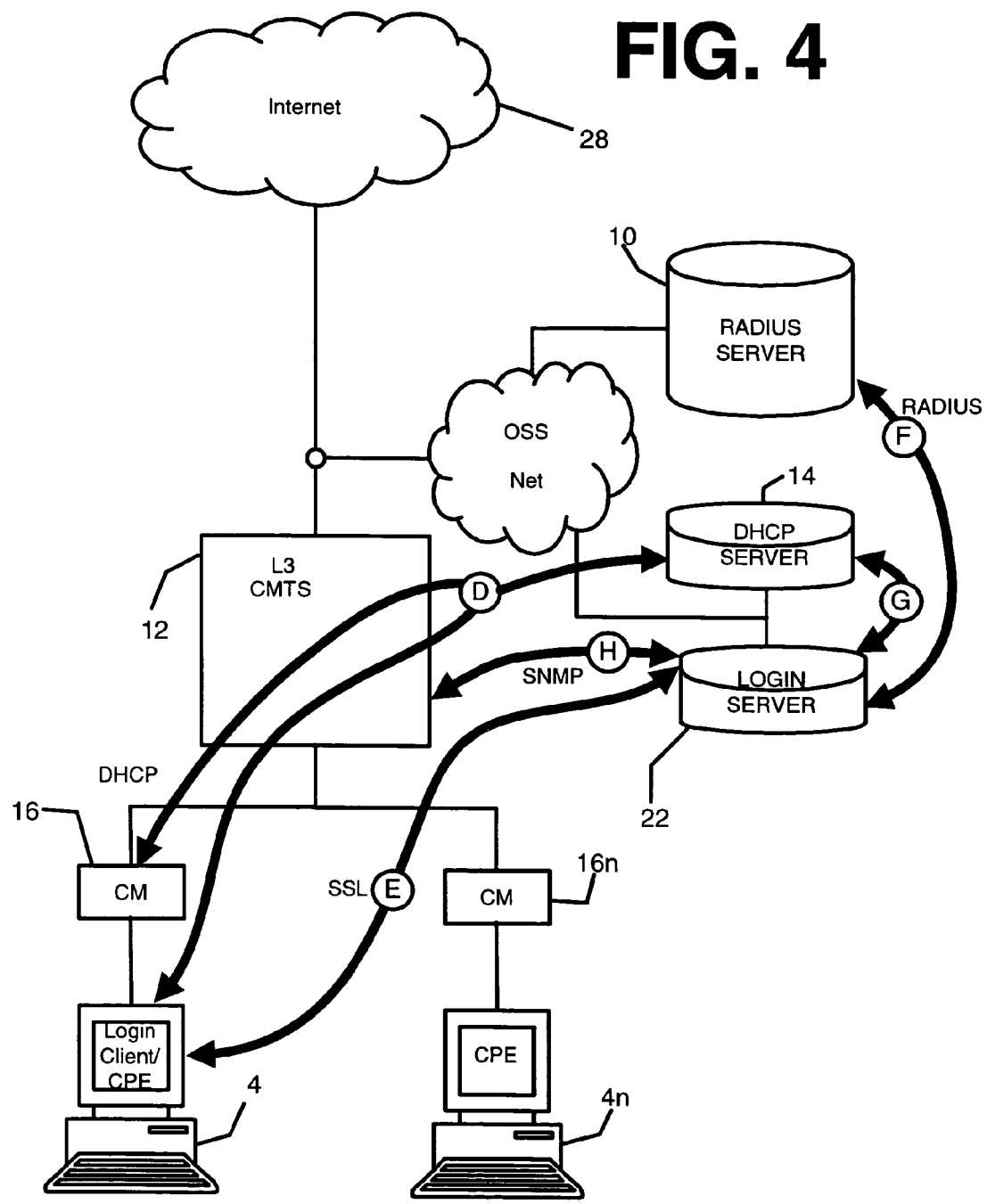
FIG. 4 illustrates the major steps in a system for using a DHCP server associated with a subscriber login server for providing secure client log-in via a layer-3 CMTS.

When the DHCP server 14 is complemented with client login server 22, the steps differ from those discussed above in reference to FIG. 2. FIG. 4 illustrates the main steps using a DHCP server associated with a subscriber login server for providing secure client log-in via a layer-3 CMTS. At step D, the modem 16 registers with the DHCP server 14 as in the prior art method, where DHCP server 14 assigns an IP address to the modem. In addition, at step D, the CPE also registers with the DHCP server 14 and receives its IP configuration as well. The login server 22 provides a login interface similar to the interface with which a CPE user 4 in FIGS. 1 and 2 would interact in inputting login and password information for example. This preferably encrypted login and password information is transmitted at step E via secure sockets layer technology, as known in the art.

Then, the login server 22 sends this information to the RADIUS server 10 and either receives back an authentication-allowed or authentication-disallowed at step F. If the former, login server 22 sends a session record to the radius server 10. If the latter, the login server 22 sends an access declined message to the client 4. If access is allowed, the login server sends a query message at step G to the DHCP server 14 containing the IP address of the client 4. The DHCP server responds with a message containing the IP address of the CMTS 12 and the MAC address of modem 16 at step G. At step H, the login server 22 communicates messages with CMTS 12 via SNMP regarding session statistics, such as, for example, octet and packet counters for modem 16 service flows. A subscriber-specific session record is generated containing RADIUS session-id, start time, beginning octet and packet counters, as well as modem 16 MAC address, CPE 4 IP address, and CMTS 12 IP address, for example. Login server then sends an SNMP set message to CMTS 12 changing the DOCSIS Subscriber Management filter group associated with modem 16 from unauthorized to authorized. The login server 22 sends login confirmation to the client 4, which displays a 'login successful' message and starts a timer for determining when to send the next periodic 'hello' message to the login server 22 stating to the login server that the client 4 is still present and the session is still active.

Since the SMS server 6 and PPPoE tunnels are removed from the payload data path, CMTS 12 can be either a preferred layer-3 IP routing device or a layer-2 switching device that facilitates information flow between CPEs 4-4n, modems and 16-16n and login server 22. This eliminates the bottleneck that forms at SMS 6 in FIGS. 1 and 4, because traffic from each device does not have to be 'squeezed' through the same 'opening' at the SMS. Rather, the preferred layer-3 CMTS 12 facilitates a separate virtual pathway for each user-device 4 and/or 16, such that traffic for each device can flow independently of traffic from the other devices.

In addition, login server 22 communicates with the RADIUS server 10 separately from the traffic flows of payload data associated with user-devices 4 and 16. Thus, RADIUS server 10 can still provide subscriber authentication and accounting. The login server 22 also communicates with the CMTS 12 via SNMP to control CPE access to network 28 and to obtain session traffic statistics. The login client 4 can periodically send a "hello" message to login server 22 to demonstrate that the client is still active. If the client 4 does not 'check-in' when expected, the login server 22 may automatically terminate the subscriber's login session. Since HTTPS, or similar secure protocol, messaging can be used for this 'check-in', payload traffic flow with network 28 is not interrupted.

Figure 5:
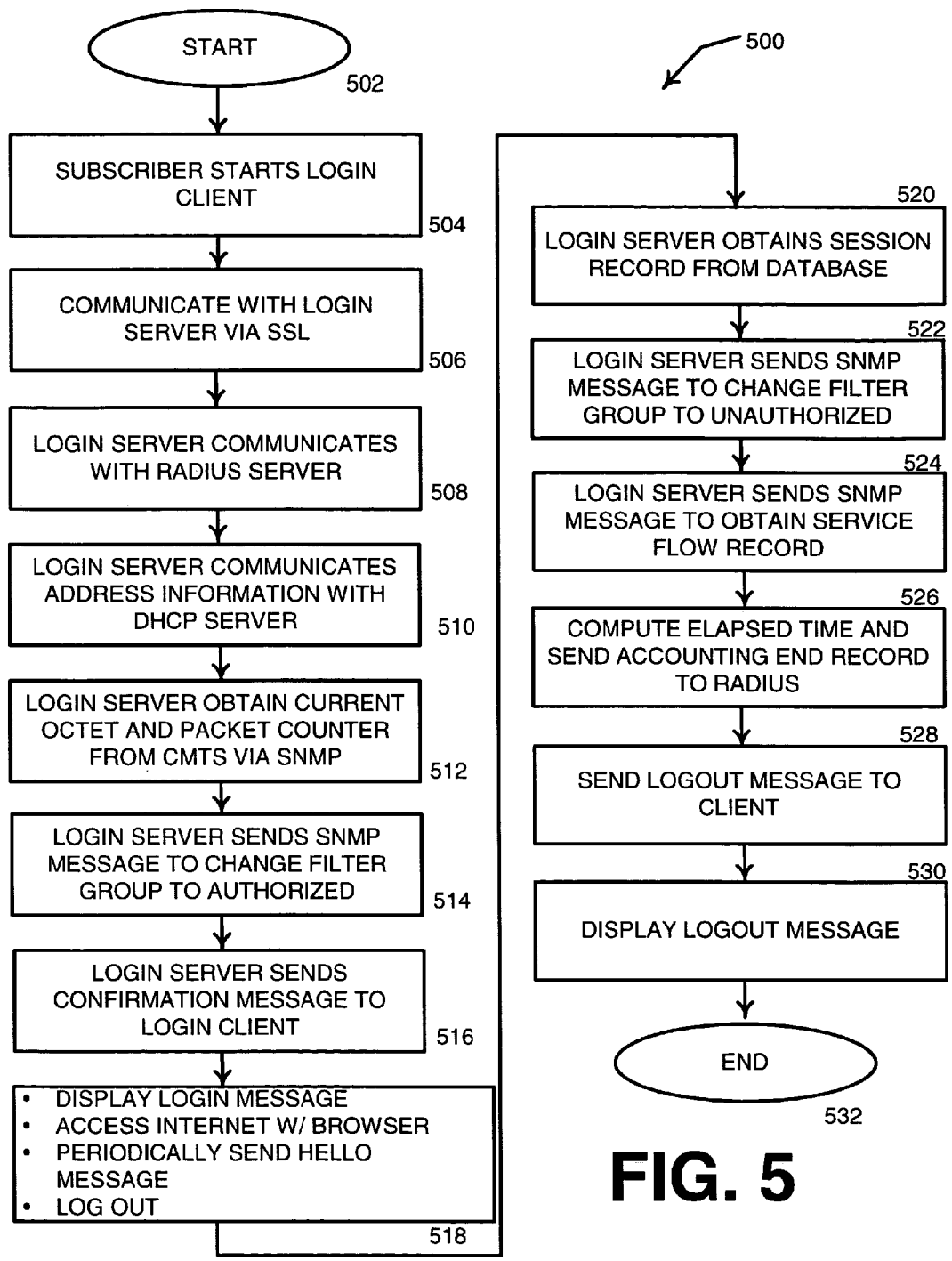
FIG. 5 illustrates a flow diagram of a process for using a DHCP server associated with a subscriber login server for providing secure client log-in via a layer-3 CMTS.

For purposes of illustration, a subscriber session scenario process 500 is illustrated in FIG. 5. Reference numerals from the previous figures apply and are used in the description of FIG. 5. In describing the start of the scenario, it is assumed that cable modem 16 has already been registered and configured via DHCP and that the CPE 4 has also been turned on and has been configured via DHCP with a public IP address, a DNS address, and a gateway address. DHCP server 14 learns the MAC address of the CM 16 hosting the CPE 4 via Option 82 and the IP address of CMTS 24 hosting the CM via the gateway address (giaddr). Furthermore, during cable modem registration, the initial IP filter groups (both upstream and downstream) for the CPE 4 attached to the CM 16 have been set to the unauthorized filter group that denies access to all IP addresses except the login server 22 and the DHCP server 14.

At step 504, the subscriber starts the login client 4, which displays a prompt for receiving the subscriber's userid and password. The client 4 securely contacts the login server 22 at step 504 using Secure Socket Layer (SSL) technology (e.g. HTTPS) and sends the encrypted userid and password to the login server 22 at 506. The login server contacts the RADIUS server 10 at step 508 and sends an Access Request message corresponding to the subscriber. If an Access Accept response is received from the RADIUS server 10 at login server 22, the login server sends an Accounting Start record to the RADIUS server. Otherwise, if an Access Reject response is received, the login server 22 sends a login failed message to the client 4.

At step 510, the login server 22 sends a query containing the IP address associated with CPE 4 to DHCP server 14 and receives the management IP address for the CMTS 24 hosting the CPE and the MAC address associated with the cable modem 16 hosting the CPE.

At step 512, the login server 22 sends an SNMP 'get' message to CMTS 24 to obtain the current octet and packet counters for the service flows associated with the subscriber's CM 16. A subscriber session database entry 30 is created for this session containing the RADIUS session-id, start time, and beginning octet and packet counters as well as the CM MAC, CPE IP, and CMTS IP addresses.

At step 514, login server 22 sends an SNMP 'set' message to CMTS 24 that changes the DOCSIS standard Subscriber Management filter group for the CM 16 hosting the CPE 4 from the CPE unauthorized filter group to the CPE authorized filter group. Note that the CPE unauthorized filter group allows the CPE 4 to only communicate with login server 22 and DHCP server 14. However, it will be appreciated that if the client 4 is a browser, for example, the client would query a DNS server that would typically respond with the IP address for login server 22, and the browser would then access the login server. The CPE authorized filter group allows unrestricted network access. However, the extent of 'unrestrictedness' may be determined by the cable operator. The login server 22 sends a login confirmation response to the login client/CPE 4 at step 516.

Step 518 summarizes multiple process steps that occur during a session that are typical for an internet browsing session with the exception of the periodic hello message sent by client 4 to the login server making it aware that the client session is still active. The login client 4 displays a login-successful message and starts a timer for the next periodic message to the login server 22. A running session elapsed time display is also started. Traffic is passed by the CPE-authorized filter group 26 at the CMTS 24 and is counted in the service flow statistics for the CM 16. If the subscriber attempts any access other than to the login server 22 before the login sequence is completed, this traffic will be silently discarded by the CMTS 24.

The login client 4 periodically sends a hello message to the login server 22. If the client 4 does not check-in with a hello message on a regular basis, the server 22 automatically logs-out the subscriber. When the subscriber reactivates the login client 4 and logs out, the login client securely connects to the login server 22 and sends the logout message to the login server.

At step 520, login server 22 obtains a subscriber session record from a session database 30, which maintains a log of each active session. Then at step 522 login server 22 sends an SNMP set message to the CMTS 24 that changes the DOCSIS standard Subscriber Management filter group 26 corresponding to the CM 16 hosting the CPE 4 from the CPE-authorized filter group to the CPE-unauthorized filter group. Access is now restricted to login server 22 only (or DNS server as discussed above).

At step 524, login server 22 sends an SNMP get message to the CMTS 24 to obtain the service flow counters for the CM 16. Server 22 then computes the session elapsed time and the octets and packets-passed values and sends an Accounting End record to the RADIUS server 10 to be associated therein with the subscriber at step 526. The Accounting End record includes the session-id, elapsed time of the session, and the number of input (upstream) and output (downstream) octets and packets transmitted during the session.

At step 528, login server 22 sends a logout confirmed message to the client 4, including the final session elapsed time and the session octet and packet passed counts. The login client 4 displays the logout-successful message at step 530, the message including the session elapsed time and the session octet and packet passed counts. It is noted that the session counts are preferably presented with respect to the subscriber's frame of reference, which is the directional inverse (upstream vs. downstream) of the RADIUS 10 accounting record. In other words, input to Radius server 10 is initiated by a subscriber, thus it is upstream, output from the RADIUS server is received by the subscriber, and thus is considered downstream. The process ends at step 532.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

The invention claimed is:

1. A device, comprising:
    a DOCSIS compliant cable modem termination system (CMTS) comprising DOCSIS Subscriber Management filters;
    the CMTS adapted to respond to SNMP control signals from a login server that adjust the DOCSIS Subscriber Management filters to positively control network access by a customer premise user equipment (CPE);
    the CMTS adapted to report network access packet counts to the login server; and
    the CMTS adapted to terminate the network access by the CPE under control of the login server.

2. The device of claim 1 wherein the CMTS is an IP routing CMTS.

3. The device of claim 1 wherein the CPE is a personal computer.

4. The device of claim 1 wherein the CMTS is a switching CMTS.

5. A method, comprising:
    configuring a DOCSIS compliant cable modem termination system (CMTS) with DOCSIS Subscriber Management filters;
    the CMTS responding to SNMP control signals from a login server that adjust the DOCSIS Subscriber Management filters to positively control network access by a customer premise user equipment (CPE);
    the CMTS reporting network access packet counts to the login server; and
    the CMTS terminating the network access by the CPE under control of the login server.

6. The method of claim 5 wherein the CMTS is an IP routing CMTS.

7. The method of claim 5 wherein the CPE is a personal computer.

8. The method of claim 5 wherein the CMTS is a switching CMTS.

* * * * *